Sept. 27, 1966  G. HORNDASCH  3,276,021
TELESCOPIC AERIAL FOR AUTOMOTIVE VEHICLES
Filed May 21, 1963  3 Sheets-Sheet 1

INVENTOR
Georg Horndasch by Michael S. Striker

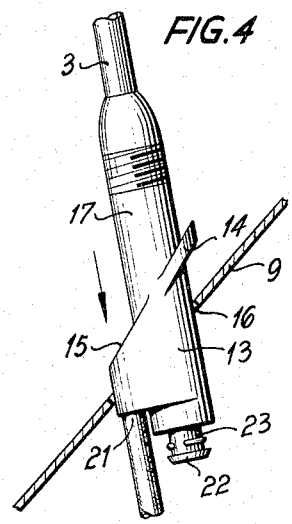
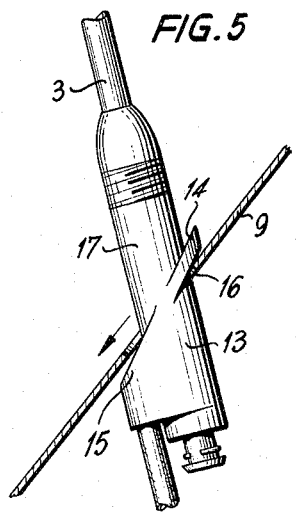
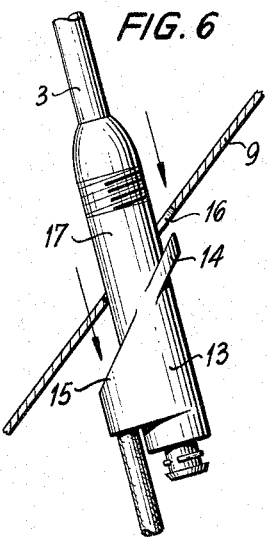
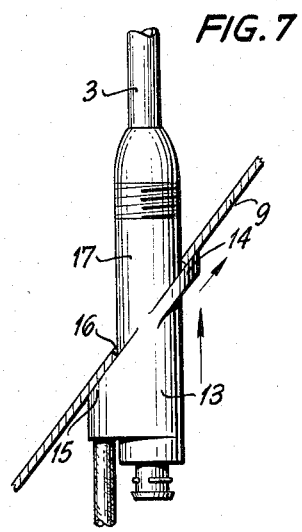

INVENTOR
Georg Horndasch
by
Michael S. Striker

United States Patent Office 3,276,021
Patented Sept. 27, 1966

3,276,021
TELESCOPIC AERIAL FOR AUTOMOTIVE
VEHICLES
Georg Horndasch, Esslingen (Neckar), Germany, assignor to Hans Kolbe and Hans Koehler, trading as fuba, Antennenwerke, Hans Kolbe & Co., Bad Salzdetfurth, Germany
Filed May 21, 1963, Ser. No. 281,998
Claims priority, application Germany, May 29, 1962, F 36,923
2 Claims. (Cl. 343—715)

The present invention concerns a telescopic aerial for mounting on the coach-work surfaces of automotive vehicles, the aerial rod of which is passed through an opening in the coach-work surface and the aerial foot of which is adapted to be tightened against the coach-work surface above the opening.

In known types of car aerials the aerial foot has a cylindrical lower part which, after the aerial rod and the upper part of the aerial foot has been passed through a circular opening in the coach-work, is tightened by way of an annular collar against the coach-work surface.

These known aerials have the disadvantage that the aerial and its aerial rod may be mounted substantially only from the inside of the coach-work, and which considerably impairs the installation of the aerial particularly in the case of mounting positions difficult of access from the inside.

In different cars fittings arranged below the mounting position prevent the aerials from being inserted from the inside, thereby rendering mounting complex and moreover tedious, since it is often necessary for parts of the automotive vehicle to be temporarily removed.

According to the present invention a telescopic aerial for mounting on the coach-work surfaces of automotive vehicles comprises an aerial rod adapted to be passed through an opening in a coach-work surface, the aerial rod having a foot adapted to be tightened over the opening against the coach-work surface, the foot being adapted to be inserted through the opening in the coach-work surface and only in its fixing position forming a stop for fixing to the coach-work surface.

The aerial foot may be provided with stop surfaces formed by shoulder-like extensions which extend beyond the opening in the coach-work surface and are supported against the coach-work surface.

The opening in the coach-work surface may be substantially elliptical and the shoulder-like extensions of the aerial foot may extend in the direction of the major axis of the elliptical opening.

The stop may be formed by a disc incorporated between a collar on the aerial foot and the coach-work surface, which disc is adapted to be inserted together with the aerial foot through the opening in the coach-work surface.

The opening in the coach-work surface may be substantially elliptical and the stop disc may extend in the direction of the major axis of the elliptical opening and beyond it.

The aerial rod may be guided in a guide sleeve in the aerial foot and in the extended position may be fixed by means of a connection comprising a circlip and corresponding groove arranged at the lower end of of the guide sleeve and the aerial rod, the circlip connection exerting a sliding lock on the aerial rod.

In one embodiment of the invention a cable connection is arranged in the direction of the longitudinal axis of the aerial below the stop formed by the aerial foot. This eliminates the obstruction by the cable connection of inserting the aerial foot through the opening in the coachwork opening in the coach-work surface.

The invention will now be described further, by way of example, with reference to the accompanying drawings, in which:

FIGS. 4 to 7 are elevations showing the various stages of assembly on installing the aerial shown in FIGS. 2 and 3 on the surface of the coach-work;

Figure 1:
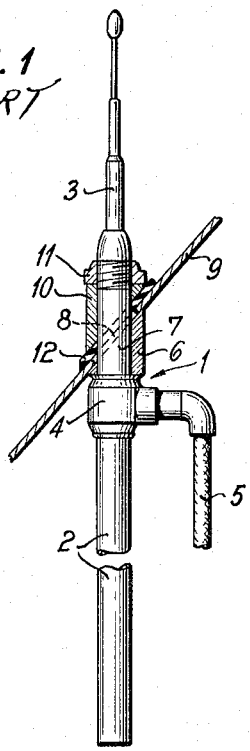
FIG. 1 is an elevation of a known type telescopic car aerial.

In the known car aerial shown in FIG. 1, an aerial foot 1 is combined with a tubular guard 2 for an aerial rod 3. The aerial foot 1 has a cylindrical collar 4 which serves as a connection for a cable 5. A diagonally cut cylindrical sleeve 6 is slipped over the collar 4 after cylindrical guide part thereof has been inserted through a corresponding cylindrical opening 8 in a coach-work surface 9 and supported thereagainst. A second diagonally cut cylindrical sleeve 10 is tightened against the coach-work surface by means of a nut 11 with the incorporation of a washer. This known aerial is thus adapted to be inserted and secured from below, i.e. from the inside, into the coach-work surface.

Figure 2:
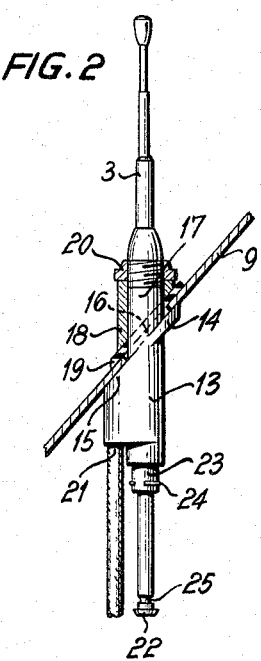
FIG. 2 is a side elevation of a car aerial constructed in accordance with the invention shown installed on the coach-work of a vehicle.
Figure 3:
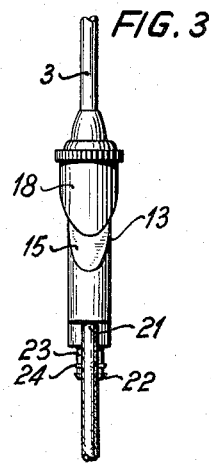
FIG. 3 is another elevation of the aerial shown in FIG. 2.

In FIGS. 2 to 7 an aerial foot 13 has two shoulder-like extensions 14 and 15 which as shown in FIG. 3 form a substantially elliptical outline. In the fixed position shown in FIG. 2 these extensions 14 and 15 extend beyond an opening 16 in the coach-work surface 9, which opening is also substantially elliptical in shape, forming a fixing stop to the coach-work surface. The fixing is effected by means of a diagonally cut sleeve 18 slipped over a cylindrical guide part 17, the sleeve 18 being tightened against the coach-work surface, with the interposition of a washer 19, by means of a nut 20. A cable connection 21 is arranged on the aerial foot 13 in the direction of the longitudinal axis of the aerial below the extension 15. The minor axis of the ellipse formed by the aerial foot 13 with the extensions 14 and 15 is equal to the diameter of the cylindrical guide part 17.

The aerial rod 3 has a stopper 22 on its lower end, for preventing it from being pulled out of the aerial foot 13, the stopper being adapted to abut against a metal guide sleeve 23 for the aerial rod 3. The metal guide sleeve 23, insulated and projecting from the aerial foot 13, has a circlip 24 provided adjacent its lower end, the circlip engaging in a groove 25 formed on the aerial rod and fixing the aerial rod in the extended position. The circlip 24 simultaneously causes a sliding lock of the aerial rod.

FIGS. 4 to 7 show the advantageous and simple method of mounting the aerial shown in FIGS. 2 and 3. The arrows shown in the drawing each indicate the principal directions of movement. The aerial foot with the aerial rod extended, is passed with slight inclination, as shown in FIG. 4, through the elliptical opening 16 in the coachwork surface, the shape of which is given by the sectional figure of the coach-work surface and through the cylinder of the guide part 17, until the upper edge of the opening 16 assumes a position just below the extension 14 (FIG. 5). In this position the extension 15 has already been passed completely through the opening 16. The aerial foot is then moved in the direction of the inclined coachwork surface, whereby the extension 14 passes through the opening 16 (FIG. 6). From this position, in which the aerial foot 13 with the extensions 14 and 15 assumes a position against the inside of the coach-work surface, the aerial foot is drawn upwardly in the direction of the coach-work surface against the underside of this coach-work surface, so that the cylindrical guide part 17 fills the opening 16 and the extensions 14 and 15 extend beyond the opening in the longitudinal direction thereof and are supported against the coach-work surface (FIG. 7). The aerial foot is then tightened in the manner shown in FIG. 2 against the coach-work surface.

Figure 8:
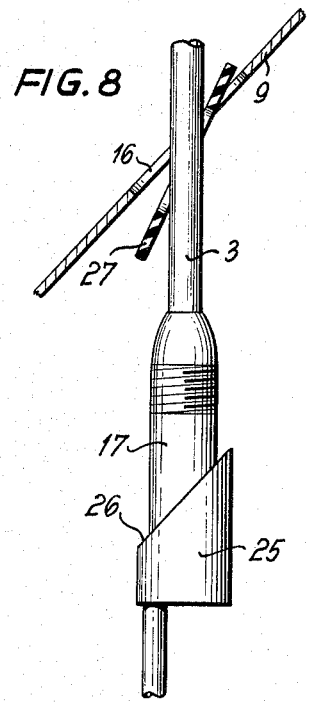
FIGS. 8 to 10 are elevations of another embodiment of the aerial constructed in accordance with the invention in various stages of assembly during installation.
Figure 9:
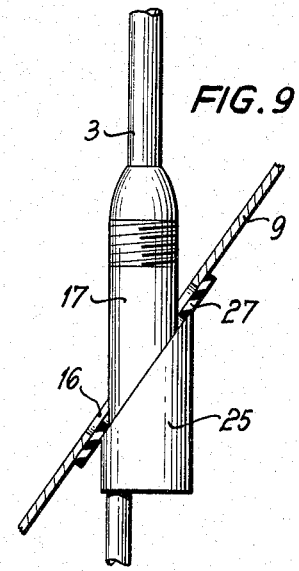
Figure 10:
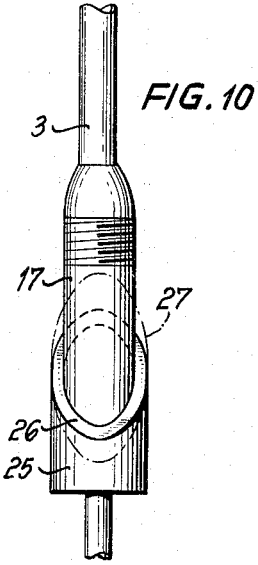

FIGS. 8 to 10 show a second schematical embodiment of the invention. The aerial foot 25 is adapted to be inserted through the elliptical opening 16 in the coach-work surface 9 and has an annular collar 26 formed thereon which is cut diagonally in accordance with the inclination of the coach-work surface 9. A disc 27, which as shown in FIG. 8 is adapted to be inserted with the aerial foot 25 through the opening 16, serves as a fixing stop for the aerial foot against the coach-work surface. The stop disc 27 is elliptical and in the fixing position shown in FIG. 9 extends beyond the opening 16 in the longitudinal direction thereof. The method of mounting is evident directly from FIGS. 8 to 10. The remaining parts for fixing the aerial foot in position on the coach-work surface correspond to those shown in FIGS. 2 to 7.

I claim:
1. A telescopic aerial for mounting on the coach-work of an automotive vehicle, comprising a telescopic mast adapted to pass through a substantially elliptical opening in said coach-work and having a major longitudinal dimension and a minor transverse dimension, said coach-work being inclined with reference to a plane normal to the axis of said mast; a foot at the base of said mast likewise adapted to pass through said opening and comprising a cylindrical first section nearer to said base of said mast and having a cross section corresponding to said minor transverse dimension, and a second section farther from said base of said mast and forming a continuation of said first section, said second section having a cross section other than circular so as to project beyond said first section in two diametrically opposite directions transversely of the axis of said first section and thereby providing a pair of diametrically opposite shoulder-like extensions adapted to be supported against the inner face of said coach-work and provided with abutment faces inclined in a manner and to a degree corresponding to the inclination of said coach-work, said abutment faces being adapted to abut said inner face of said coach-work so that said foot may be inserted through said opening from the outer face of said coach-work, said mast comprising a plurality of telescopable sections including an outermost section of maximum diameter in which the other sections are receivable, and said foot comprising a guide sleeve provided therewithin in which said outermost section is receivable so that the entire mast, including said outermost section, can be telescoped into said foot; and a transmission cable electrically connected with said mast and depending from said second section of said foot axially offset from said mast whereby to prevent interference of said cable with insertion of said second section through the elliptical opening.

2. A telescopic aerial adapted to be secured to a supporting body having a mounting aperture therethrough with a transverse dimension and with a longitudinal dimension greater than said transverse dimension, said supporting body having an outer surface and an inner surface and including a sheet member inclined with respect to a vertical plane passing through said aperture and comprising a telescopable aerial mast; and a mounting device for securing said mast to said supporting body, said mounting device including an elongated base member provided with integral shoulder means including a pair of projections projecting in opposite directions transversely of the elongation of said member and having outermost ends spaced from one another by a distance greater than said longitudinal dimension of said mounting aperture, said projections having respective abutment surfaces inclined with respect to the axis of said mast by a degree corresponding to the inclination of said sheet member whereby said base member is insertable through said aperture from said outer surface is one position of inclination and thereupon movable to another position of inclination in which said shoulder means will engage said inner surface to prevent withdrawal of said member through said aperture; and a transmission cable electrically connected with said mast, portions of said mast in telescoped condition of the same projecting downwardly beyond said base member and said cable depending from said base member axially off-set from said mast whereby interference of said cable with insertion of said base member into said mounting aperture and with telescoping of said mast is precluded.

References Cited by the Examiner

UNITED STATES PATENTS

| | | | |
|---|---|---|---|
| 1,049,283 | 12/1912 | Westphal | 285—209 |
| 2,563,540 | 8/1951 | Ludwig et al. | 343—901 |
| 3,123,665 | 3/1964 | Uluch | 285—209 |
| 3,138,660 | 6/1964 | Cejka | 285—209 |
| 3,181,899 | 5/1965 | McKnight | 285—209 |

FOREIGN PATENTS 101,689  7/1916  Great Britain.

HERMAN KARL SAALBACH, *Primary Examiner.*

E. LIEBERMAN, L. ALLAHUT, *Assistant Examiners.*